United States Patent [19]
Röhrle et al.

[11] Patent Number: 5,496,216
[45] Date of Patent: Mar. 5, 1996

[54] TORSION DAMPER WITH RESILIENT RADIAL ACTING SPRING

[75] Inventors: Dieter Röhrle, Montmorency; Ciriaco Bonfilio, Clichy, both of France

[73] Assignee: Valeo, Paris, France

[21] Appl. No.: 162,615

[22] Filed: Dec. 7, 1993

[30] Foreign Application Priority Data

Dec. 7, 1992 [FR] France .................................. 92 14707

[51] Int. Cl.$^6$ .................................................... F16D 3/52
[52] U.S. Cl. ................................................ 464/66; 464/160
[58] Field of Search ................................. 464/66, 67, 68, 464/89, 160, 30; 192/106.1; 74/574

[56] References Cited

U.S. PATENT DOCUMENTS

| | | | |
|---|---|---|---|
| 4,222,246 | 9/1980 | Rongley | 464/77 |
| 4,570,774 | 2/1986 | Loizeau | 464/66 |
| 4,856,636 | 8/1989 | Meinhard | 192/70.17 |
| 5,169,357 | 12/1992 | Graton | 172/106.1 |
| 5,180,335 | 1/1993 | Maucher et al. | 464/66 |

FOREIGN PATENT DOCUMENTS

| | | |
|---|---|---|
| 2610683 | 8/1988 | France . |
| 3203648 | 9/1982 | Germany . |
| 3248120 | 6/1984 | Germany . |
| 3931429 | 4/1990 | Germany . |
| 8915354 | 4/1990 | Germany . |
| 4307133 | 10/1993 | Germany . |

*Primary Examiner*—Daniel P. Stodola
*Assistant Examiner*—Eileen A. Dunn
*Attorney, Agent, or Firm*—Longacre & White

[57] ABSTRACT

A torsion damper, in particular for a motor vehicle clutch, comprises two coaxial parts, namely a primary coaxial part and a secondary coaxial part which are mounted for relative rotation against the action of springs, with friction member also being arranged to act between the two coaxial parts. The friction member comprise a radially acting friction ring in the form of a sleeve, meshing, with a clearance, with one of the coaxial parts, together with a radially acting spacing ring, which is coaxial with the friction ring and which engages either the outer or the inner periphery of the latter, the spacing ring being mounted on the other one of the coaxial parts for rotation with that part.

10 Claims, 2 Drawing Sheets

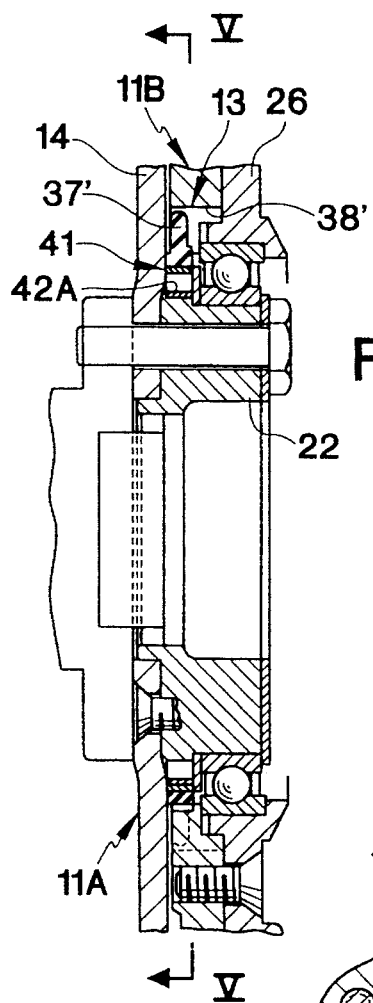
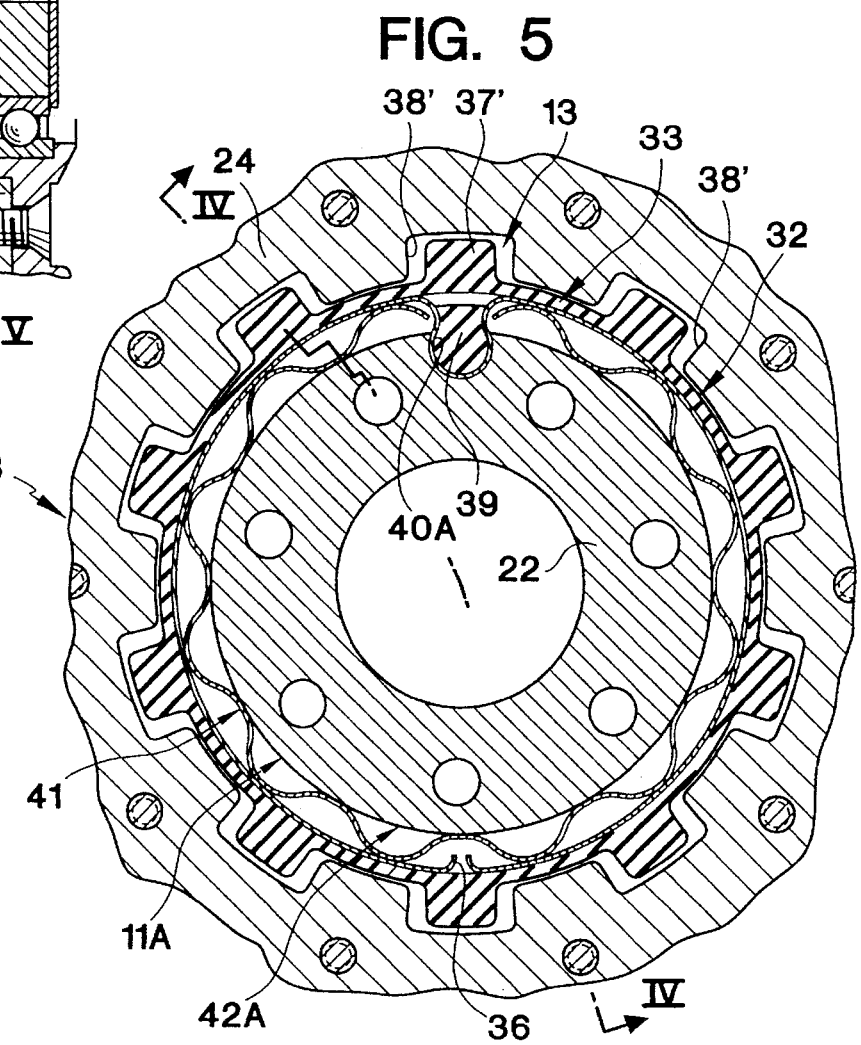

5,496,216

TORSION DAMPER WITH RESILIENT RADIAL ACTING SPRING

FIELD OF THE INVENTION

This invention relates to torsion dampers, especially though not exclusively for motor vehicles, and being of the kind comprising two coaxial parts, namely a primary coaxial part and a secondary coaxial part, which are mounted for relative rotation against the action of resilient means, the damper further including friction means acting between the two said coaxial parts.

BACKGROUND OF THE INVENTION

By suitable mass distribution as between the two coaxial parts of the torsion damper, the resonant frequency of the latter (which is typically of the kind commonly referred to as a double damped flywheel) can be arranged, with advantage, to have a value below the frequency of vibration occurring in the slow running mode of the engines of most motor vehicles. This enhances the comfort of the occupants of the vehicle at all engine speeds. However, on starting and stopping, it is important to resist oscillations, which may have a high amplitude, which may occur between the two coaxial parts at the resonant frequency. It is for this reason that the above mentioned friction means are provided between the two parts of the damper.

In the specification of German published patent application DE 3 931 429A, the said friction means comprise a friction ring which is only effective beyond a particular amount of angular displacement between the two coaxial parts of the damper. Thus there is no frictional damping of low amplitude oscillations of the coaxial parts, though on the other hand the desired frictional damping does occur when oscillations of higher amplitude take place.

However, in the above mentioned published German patent document, this friction ring works in the axial direction, so that the resilient means which are commonly provided for the purpose of loading the friction ring must of necessity also work in the axial direction. Having regard to the amount of space available, the deflection of these resilient means is of necessity very restricted.

Control of the load on the friction ring is accordingly somewhat poor, as a result of which it is almost impossible to mitigate the consequences of its inevitable wear.

DISCUSSION OF THE INVENTION

An object of the invention is to provide a torsion damper which does not have the above mentioned drawbacks, and which in addition has further advantages.

According to the invention, a torsion damper, especially for a motor vehicle, of the kind comprising two coaxial parts, namely a primary coaxial part and a secondary coaxial part respectively, which are mounted for rotation with respect to each other against the action of resilient means, with friction means working between the said coaxial parts, is characterised in that the said friction means comprise, acting in the radial direction, a friction ring in the form of a sleeve member which meshes, with a clearance, with one of the said coaxial parts, together with a spacing ring coaxial with the said friction ring and bearing on either the inner or the outer periphery of the latter, the said spacing ring being mounted on the other one of the said coaxial parts for rotation therewith.

The resilient means which provide the load on the friction ring thus themselves also act in the radial direction, and as a result they can be, and preferably are, arranged to deflect over a distance which is larger than has been the case where these resilient means worked in the axial direction.

In addition, the friction ring in a torsion damper according to the present invention is in a form which is easier to make than a simple friction ring, and can also provide improved frictional effects which can be better controlled. For example, this friction ring can very simply be made of a synthetic material by injection moulding.

In a preferred form of torsion damper according to the invention, it is the primary coaxial part with which the friction ring meshes, while the associated spacing ring is mounted on the secondary coaxial part for rotation with the latter. In such a case, the spacing ring is preferably engaged on the outer periphery of the friction ring, that is to say on its periphery having the larger diameter, so as to embrace the friction ring resiliently. With this arrangement, centrifugal forces acting at high speed produce some reduction in the friction. It is advantageous that the force opposed to the friction force, thereby reducing the latter, acts in the desired direction, since (as indicated above) the use of this friction is only necessary in practice on starting and stopping.

The various features and advantages of the invention will appear more clearly on a reading of the detailed description which follows, of preferred embodiments of the invention, given by way of example only and with reference to the accompanying drawings.

BRIEF DESCRIPTION OF THE DRAWINGS

FIG. 4 is a view in axial cross section, taken on the broken line IV—IV in FIG. 5, and repeating part of FIG. 1 but showing part of a torsion damper in another embodiment of the invention.

FIG. 5 is a partial view in transverse cross section taken on the line V—V in FIG. 4, showing the same embodiment as in FIG. 4.

DESCRIPTION OF PREFERRED EMBODIMENTS OF THE INVENTION

Figure 1:
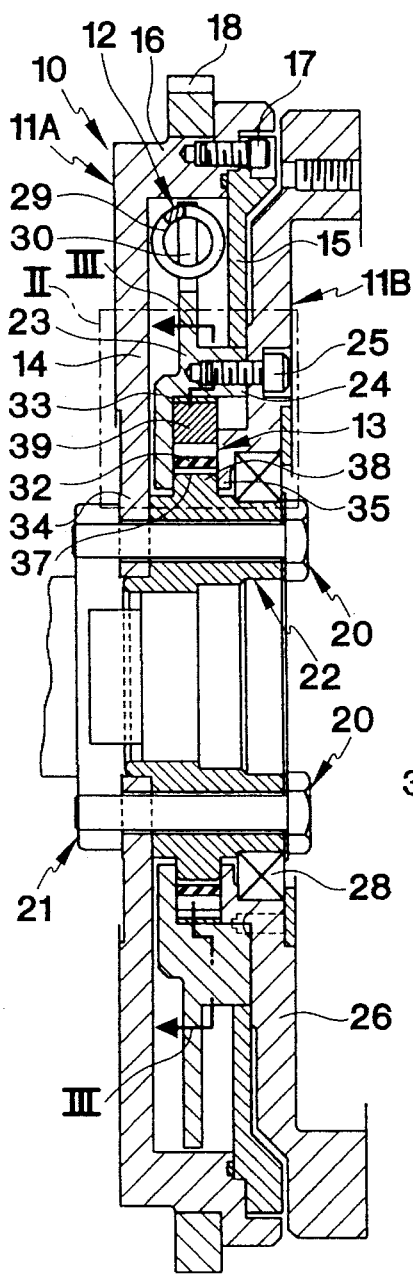
FIG. 1 is a view in axial cross section showing a torsion damper in accordance with the invention, the cross section being taken on the broken line I—I in FIG. 3.

As can be seen in the drawings, and in a manner known per se, the torsion damper 10 includes two coaxial parts 11A and 11B. These comprise a primary coaxial part 11A and a secondary coaxial part 11B. The parts 11A and 11B are mounted for rotation with respect to each other against the action of resilient means 12, with friction means 13 working between the two coaxial parts 11A and 11B.

In this example, the primary coaxial part 11A includes two radial plates 14 and 15. An enclosing ring element 16 which acts as a spacer, and which is integral with the first radial plate 14, is arranged at the outer periphery of the plates 14 and 15; while the second radial plate 15 is itself secured to this element 16, or outer flange, by means of screws 17. The flange 16 carries a starter crown 18. In addition, the primary coaxial part 11A includes a hub 22 which is secured to the first radial plate 14 at the inner periphery of the latter by means of screws 20. This arrangement also provides the means for mounting the assembly on a shaft 21. In the present example this shaft 21 is the crankshaft of the internal combustion engine of a motor vehicle.

The secondary coaxial part 11B in this example comprises a damper plate 23 which is arranged between the two radial plates 14 and 15 of the primary coaxial part 11A. The damper plate 23 is secured to a second hub 24 which is in contact with the second radial plate 15. The coaxial part 11B also comprises a plate 26, which is carried on the hub 24 of the damper plate 23. It is secured to the latter by means of screws 25. Rolling bearing means 28 are interposed between the inner periphery of the plate 26 and the hub 22 of the primary coaxial part 11A. A clutch mechanism (not shown) is typically fastened to the plate 26 at the outer periphery of the latter (as indicated at the right hand side of FIG. 1).

In the present case the resilient means 12 which work between the two coaxial parts 11A and 11B consist of circumferentially acting resilient means, while the plate 26 is the reaction plate of a clutch. The friction disc of this clutch (not shown) is mounted on the input shaft of the gearbox of the vehicle, for rotation with this input shaft. The resilient means 12 in this example are in the form of a plurality of coil springs 29, which are arranged circumferentially between the arms 30 of the damper plate 23 of the secondary coaxial part 11B. The springs 29 engage at their ends with projecting elements, which are not shown in the Figures, but which are carried for this purpose by the primary coaxial part 11A.

Figure 2:
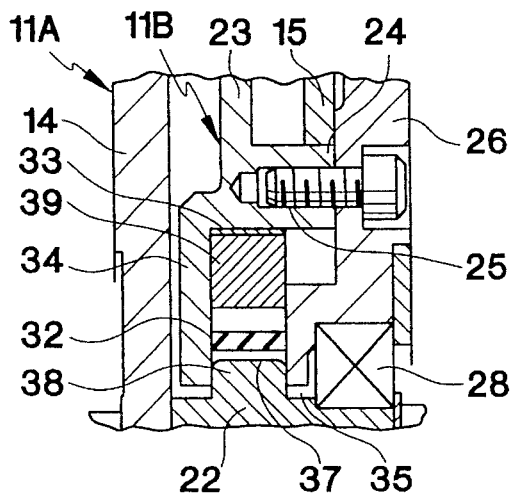
FIG. 2 repeats, but on a larger scale, the detail indicated within the box II in phantom lines in FIG. 1.

The friction means 13 which also work between the two coaxial parts 11A and 11B include a radially acting friction ring 32 in the general form of a sleeve, which meshes loosely with one of the two coaxial parts 11A and 11B, with a circumferential clearance being defined between the ring 32 and the part 11A or 11B with which it meshes. The friction means 13 also include a spacing ring 33 coaxial with the friction ring 32 and applied to either the outer or the inner periphery of the latter, the spacer ring 33 being mounted on the other coaxial part 11B or 11A for rotation with it. In the example shown in FIGS. 1 to 3, this friction ring 32 meshes, again with a clearance, with the primary coaxial part 11A, while the spacing ring 33 is mounted on the secondary coaxial part 11B with which it rotates.

Thus in this case the spacing ring 33 is engaged with the outer periphery, i.e. that having the largest diameter, of the friction ring 32. Also in this example, the friction ring 32 and the spacing ring 33 work radially between the hub 22 of the primary coaxial part 11A and the hub 24 of the damper plate 23 of the secondary coaxial part 11B. The rings 32 and 33 also extend axially between, firstly, a radial ring element 34 which extends radially inwardly from the hub 24 of the damper plate 23, i.e. towards the inner hub 22 of the primary coaxial part 11A, and secondly, a further radial ring element 35 which extends radially inwards, again towards the hub 22, from the reaction plate 26.

Figure 3:
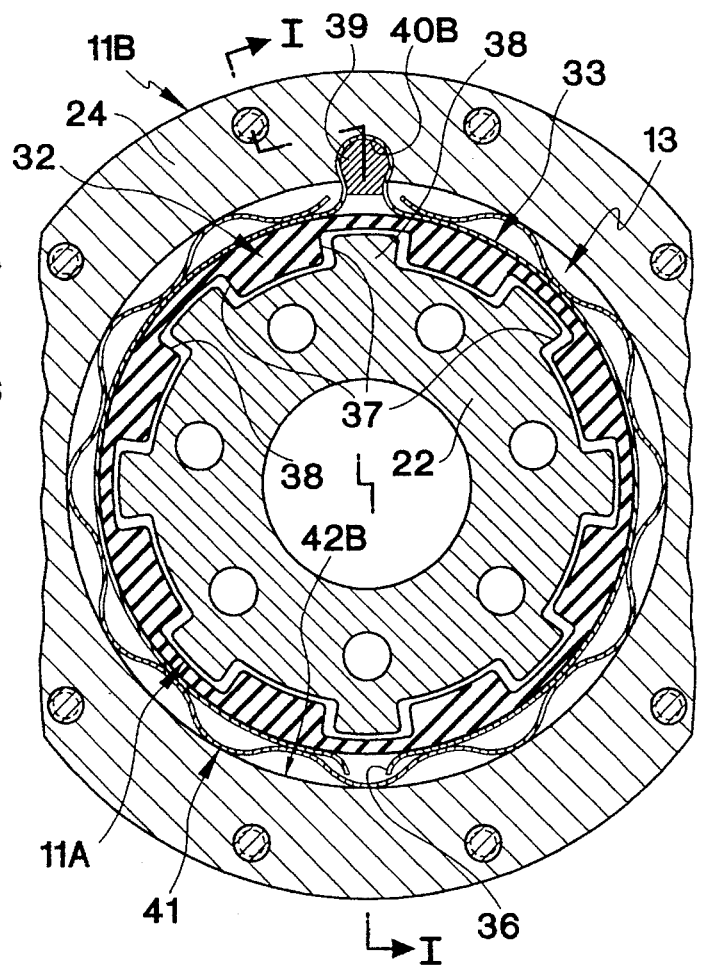
FIG. 3 is a view in transverse cross section showing a small part of the torsion damper in accordance with the invention, the cross section being taken on the broken line III—III in FIG. 1.

In the present example, as is best seen in FIG. 3, the friction ring 32 is solid and is quite heavy. It is for example made of a suitable fibre reinforced synthetic material. At its inner periphery, i.e. that having the smaller diameter, the ring 32 is formed with axial slots 37, by means of which it is engaged with the above mentioned clearance on teeth 38, which project radially outwards and which are formed for this purpose on the hub 22 of the primary coaxial part 11A.

The spacing ring 33 in this example consists of a leaf of, for example, metal, which is suitably profiled for example as shown in FIG. 3. This Figure shows this ring 33 as being discontinuous, defining a gap 36 and resiliently embracing the friction ring 32 over the outer periphery of the latter. A small local portion of the spacing ring 33 also embraces an axially extending peg 39 which is anchored in the secondary coaxial part 11B of the damper, so that the spacing ring 33 is thus, as it were, gripped between the peg 39 and the secondary coaxial part 11B. In this way the ring 33 is mounted on the secondary coaxial part 11B for rotation with the latter.

In the particular example shown in FIG. 3, the peg 39 is simply engaged axially, together with the associated portion of the spacing ring 33, in a groove 40B which is formed in the inner periphery of the hub 24 of the damper plate 23. The cross sectional profile of the groove 40B subtends at the centre of the groove an angle greater than 180°. Again in this example, the peg 39 is arranged in a position which is diametrically opposed to the gap 36 formed in the discontinuous spacing ring 33. It will also be seen that the cross sectional shape of the peg 39 is similar to that of the Greek letter omega, so that the cooperating portion of the ring 33 is of the same shape.

As shown, the spacing ring 33 is preferably subjected to the action of radially acting resilient means which bias it at all times into engagement against the friction ring 32. In the present example these radially acting resilient means comprise a springy corrugated ring 41, which works radially between the spacing ring 33 and a cylindrical surface 42B of the secondary coaxial part 11B, on which the spacing ring 33 is mounted for rotation with it as mentioned above. The corrugated ring 41 bears radially on the spacing ring 33 and the surface 42B, alternately.

In practice, the corrugated ring 41, which is discontinuous, defining a gap within which the peg 39 lies, consists of a suitably shaped strip of material, while the surface 42B is the inner periphery of the hub 24 of the damper plate 23.

Reference is now made to FIGS. 4 and 5, in which the friction ring 32 meshes, again with a clearance, with the secondary coaxial part 11B, the spacing ring 33 being mounted on the primary coaxial part 11A for rotation with the latter. The spacing ring 33 is now applied to the friction ring 33 at the inner periphery of the latter, while at its outer periphery the friction ring 33 has projecting teeth 37' with which slots 38' engage, but with a clearance between the teeth and the slots. The slots are formed for this purpose on the inner periphery of the hub 24 of the damper plate 23 of the secondary coaxial part 11B.

In this embodiment, the peg 39, by which the spacing ring 33 is mounted on the primary coaxial part 11A for rotation with the latter, is engaged axially within a groove 40A which is formed in the outer periphery of the hub 22 of the primary coaxial part 11A, while the surface 42A, on which the corrugated ring 41 bears from place to place, is defined on the outer periphery of the hub 22.

The invention is of course not limited to the embodiments described above and shown in the drawings, but covers any other embodiment.

What is claimed is:

1. A torsion damper comprising: a primary part; a secondary part; means mounting the said primary and secondary parts coaxially with each other for relative rotation of said coaxial parts; resilient means disposed between the coaxial parts for resisting said relative rotation; and friction means operatively arranged between the said coaxial parts, wherein the said friction means comprises a radially acting friction ring in the form of a sleeve, meshing with a first one of the coaxial parts and defining a clearance between itself and the first one of the coaxial parts, and a spacing ring coaxial with the said friction ring and mounted on the other of said coaxial parts, the spacing ring being in engagement with one of the outer and inner peripheries of the friction ring, wherein the spacing ring is a profiled leaf element and comprises a small local portion in local engagement around a peg carried by and anchored in the other one of said coaxial parts whereby the spacing ring is mounted on the other one of said coaxial parts for rotation therewith, said spacing ring being gripped between said peg and the other one of coaxial parts.

2. A torsion damper according to claim 1, wherein said first one and the other one of said coaxial parts are the said primary and secondary coaxial parts respectively.

3. A torsion damper according to claim 2, in which said spacing ring engages with the outer periphery of the friction ring.

4. A torsion damper according to claim 1, wherein said first and the other one of said coaxial parts are the secondary and primary coaxial parts respectively.

5. A torsion damper according to claim 4, wherein the spacing ring is in engagement with the inner periphery of the friction ring.

6. A torsion damper according to claim 1, wherein the spacing ring is discontinuous, and defines a gap between terminal ends of the spacing ring.

7. A torsion damper according to claim 1, further including radially acting resilient means in engagement with the said spacing ring, whereby to bias said spacing ring into engagement against the friction ring.

8. A torsion damper according to claim 7 wherein the other one of said coaxial parts defines an engagement surface for engagement with the said radially acting resilient means, the latter comprising a corrugated ring engaging alternately on the spacing ring and the said engagement surface.

9. The torsion damper according to claim 1, wherein the peg is engaged, together with the small local portion of the spacing ring in a groove which is formed in the other one of said coaxial parts.

10. The torsion damper according to claim 9, wherein a cross sectional profile of the groove subtends at the center of the groove an angle greater than 180 degrees.

* * * * *